（12）United States Patent
Byrd et al.

(10) Patent No.: US 10,934,911 B2
(45) Date of Patent: Mar. 2, 2021

(54) HEAT SHIELD SYSTEM AND METHOD

(71) Applicant: Caterpillar Inc., Deerfield, IL (US)

(72) Inventors: Jeremy Byrd, West Lafayette, IN (US);
Aaron L. Robinson, Lafayette, IN (US); Craig P. Hittle, Dunlap, IL (US);
Keith W. Mellencamp, Green Castle, IN (US)

(73) Assignee: Caterpillar Inc., Peoria, IL (US)

( * ) Notice: Subject to any disclaimer, the term of this patent is extended or adjusted under 35 U.S.C. 154(b) by 110 days.

(21) Appl. No.: 16/246,962

(22) Filed: Jan. 14, 2019

(65) Prior Publication Data

US 2020/0224568 A1 Jul. 16, 2020

(51) Int. Cl.
| | | |
|---|---|---|
| *F01N 3/04* | (2006.01) | |
| *F01P 3/14* | (2006.01) | |
| *F01P 5/10* | (2006.01) | |
| *F02B 37/007* | (2006.01) | |
| *F02B 37/02* | (2006.01) | |
| *F02B 37/22* | (2006.01) | |

(52) U.S. Cl.
CPC ............. *F01N 3/046* (2013.01); *F01P 3/14* (2013.01); *F01P 5/10* (2013.01); *F02B 37/007* (2013.01); *F02B 37/02* (2013.01); *F02B 37/22* (2013.01); *F01N 2260/024* (2013.01)

(58) Field of Classification Search
CPC .. F01N 3/046; F01N 2260/024; F02B 37/007; F02B 37/02; F02B 37/22; F01P 3/14; F01P 5/10
See application file for complete search history.

(56) References Cited

U.S. PATENT DOCUMENTS

| | | |
|---|---|---|
| 4,179,884 A | 12/1979 | Koeslin |
| 4,866,934 A | 9/1989 | Lindstedt |
| 5,408,827 A | 4/1995 | Holtermann et al. |
| 6,511,355 B1 | 1/2003 | Woodward |
| 6,890,228 B2 | 5/2005 | Tawa et al. |
| 7,086,370 B2 | 8/2006 | Yonazawa et al. |

(Continued)

FOREIGN PATENT DOCUMENTS

| | | |
|---|---|---|
| DE | 3539778 | 5/1987 |
| DE | 102004053463 | 5/2006 |

(Continued)

*Primary Examiner* — Audrey K Bradley
*Assistant Examiner* — Edward Bushard
(74) *Attorney, Agent, or Firm* — Leydig, Voit & Mayer, Ltd.

(57) ABSTRACT

An internal combustion engine includes a cylinder case forming a plurality of coolant outlets, and an exhaust log structure disposed on the cylinder case and including inner and outer walls defining a coolant jacket therebetween, a plurality of coolant inlets extending through the outer wall and being fluidly connected to the coolant jacket, and a plurality of transfer housings. Each transfer housing includes an inner housing wall forming a gas passage, an outer housing wall disposed at an offset distance around the inner housing wall such that a cooling passage is defined in a space between the inner and outer housing walls, and a coolant inlet and a coolant outlet in fluid communication with the cooling passage. The plurality of coolant inlets is fluidly connected to the plurality of coolant outlets via the cooling passages in the plurality of transfer housings.

10 Claims, 7 Drawing Sheets

(56) References Cited

U.S. PATENT DOCUMENTS

| | | |
|---|---|---|
| 7,311,066 B1 | 12/2007 | Westerbeke, Jr. |
| 8,973,356 B2 * | 3/2015 | Karim .................... F01N 3/046 60/320 |
| 8,978,372 B2 | 3/2015 | Ochiai et al. |
| 9,695,721 B2 | 7/2017 | Maloney et al. |
| 10,012,144 B2 | 7/2018 | Nakayama |
| 2002/0056444 A1 | 5/2002 | Chou et al. |
| 2012/0192557 A1 * | 8/2012 | Johnson .................. F01D 25/14 60/599 |
| 2013/0000287 A1 | 1/2013 | Grivetti et al. |
| 2014/0165556 A1 * | 6/2014 | Plagens .................. F02F 1/243 60/602 |
| 2016/0348564 A1 * | 12/2016 | Maloney ............. F01N 13/1827 |
| 2017/0284249 A1 | 10/2017 | Oilar |

FOREIGN PATENT DOCUMENTS

| | | |
|---|---|---|
| DE | 102016109770 | 12/2016 |
| JP | 60-101215 A | 6/1985 |
| JP | 2010-248909 A | 11/2010 |

\* cited by examiner

HEAT SHIELD SYSTEM AND METHOD

TECHNICAL FIELD

This patent disclosure relates generally to internal combustion engines and, more particularly, to systems and methods for heat shielding.

BACKGROUND

Typical internal combustion engines having turbochargers operate by providing exhaust gas energy to drive one or more turbines, each of which is connected to and drives a respective air compressor. The compressors provide a charge, which may be cooled and which is provided to the engine cylinders during operation. During operation, exhaust gas at a high temperature and pressure is provided directly from exhaust ports of the engine cylinders, through connecting passages to an exhaust manifold, which in turn supplies exhaust gas to the inlets of turbines. In certain engine configurations such as Vee engines, the exhaust manifolds can be disposed on an outer side of the engine, or within the valley of the Vee. In either case, heat shielding is typically required to contain heat dissipation in the form of radiation, convection and the like from the engine's exhaust manifolds to surrounding engine and/or vehicle structures.

Typical heat shields for engines are made using reflective and/or heat insulative materials that surround heat sources. Such structures are often expensive and require additional assembly cost and space on the engine. Alternative heat shielding arrangements have also been used in the past. For example, U.S. Pat. No. 4,179,884 ("Koeslin") describes a dual-walled exhaust manifold that includes sealed air pockets and coolant passages to create a heat-transfer barrier between an inner skin of the manifold, through which exhaust gas flows, and an outer skin of the manifold. While such arrangements are at least partially effective in containing heat within an engine component such as an exhaust manifold, in engines with larger displacements that operate at higher loads, which produce exhaust gas at high temperatures, the relatively low coolant flowrates and restricted flow area between the inner and outer walls of the manifolds may tend to boil the coolant, which can create steam and/or introduce condensates within the flow passages that will further restrict and may, over time, block the fluid passages.

SUMMARY

The disclosure describes, in one aspect, an internal combustion engine. The internal combustion engine includes a cylinder case having a plurality of cylinder heads connected to the cylinder case and forming a plurality of coolant outlets, an exhaust log structure disposed on the cylinder case and including: an inner wall forming a gas plenum, an outer wall disposed at an offset distance from the inner wall such that a coolant jacket is defined between the inner and outer walls, a plurality of coolant inlets extending through the outer wall and being fluidly connected to the coolant jacket, and a plurality of transfer housings. Each transfer housing includes an inner housing wall forming a gas passage, an outer housing wall disposed at an offset distance around the inner housing wall such that a cooling passage is defined in a space between the inner and outer housing walls, and a coolant inlet and a coolant outlet in fluid communication with the cooling passage. The plurality of coolant inlets is fluidly connected to the plurality of coolant outlets via the cooling passages in the plurality of transfer housings.

In another aspect, the disclosure describes an internal combustion engine. The internal combustion engine includes a cylinder case having a plurality of cylinders, a plurality of cylinder heads connected to the cylinder case and forming a plurality of exhaust runners and a plurality of coolant outlets, an exhaust log structure disposed on the cylinder case and including: an inner wall forming a gas plenum, an outer wall disposed at an offset distance from the inner wall such that a coolant jacket is defined between the inner and outer walls, a plurality of gas inlet ports and a plurality of gas outlet ports extending through the inner and outer walls and being fluidly connected to the gas plenum, a plurality of coolant inlets extending through the outer wall and being fluidly connected to the coolant jacket, and a plurality of transfer housings.

Each transfer housing includes an inner housing wall forming a gas passage, the gas passage fluidly connecting one of the plurality of exhaust runners with one of the plurality of gas inlet ports; an outer housing wall disposed at an offset distance around the inner housing wall such that a cooling passage is defined in a space between the inner and outer housing walls; a coolant inlet and a coolant outlet in fluid communication with the cooling passage; a plurality of turbochargers, each including a turbine, wherein: an inlet of the respective turbine is connected to receive exhaust gas from one of the plurality of gas outlet ports, the plurality of gas inlet ports is connected to receive exhaust gas from the plurality of exhaust runners, and the plurality of coolant inlets is fluidly connected to the plurality of coolant outlets via the cooling passages in the plurality of transfer housings.

In yet another aspect, the disclosure describes a method for operating an internal combustion engine. The method includes providing a cylinder case having a plurality of cylinders; providing a plurality of cylinder heads connected to the cylinder case and forming a plurality of exhaust runners and a plurality of coolant outlets; providing an exhaust log structure disposed on the cylinder case and including: an inner wall forming a gas plenum; an outer wall disposed at an offset distance from the inner wall such that a coolant jacket is defined between the inner and outer walls; a plurality of gas inlet ports and a plurality of gas outlet ports extending through the inner and outer walls and being fluidly connected to the gas plenum; providing a plurality of coolant inlets extending through the outer wall and being fluidly connected to the coolant jacket; and providing a plurality of transfer housings.

Each transfer housing includes an inner housing wall forming a gas passage, the gas passage fluidly connecting one of the plurality of exhaust runners with one of the plurality of gas inlet ports; an outer housing wall disposed at an offset distance around the inner housing wall such that a cooling passage is defined in a space between the inner and outer housing walls; a coolant inlet and a coolant outlet in fluid communication with the cooling passage; a plurality of turbochargers, each including a turbine; connecting an inlet of the respective turbine to receive exhaust gas from one of the plurality of gas outlet ports, connecting the plurality of gas inlet ports to receive exhaust gas from the plurality of exhaust runners, and fluidly connecting the plurality of coolant inlets to the plurality of coolant inlets via the cooling passages in the plurality of transfer housings.

DETAILED DESCRIPTION

Figure 1:
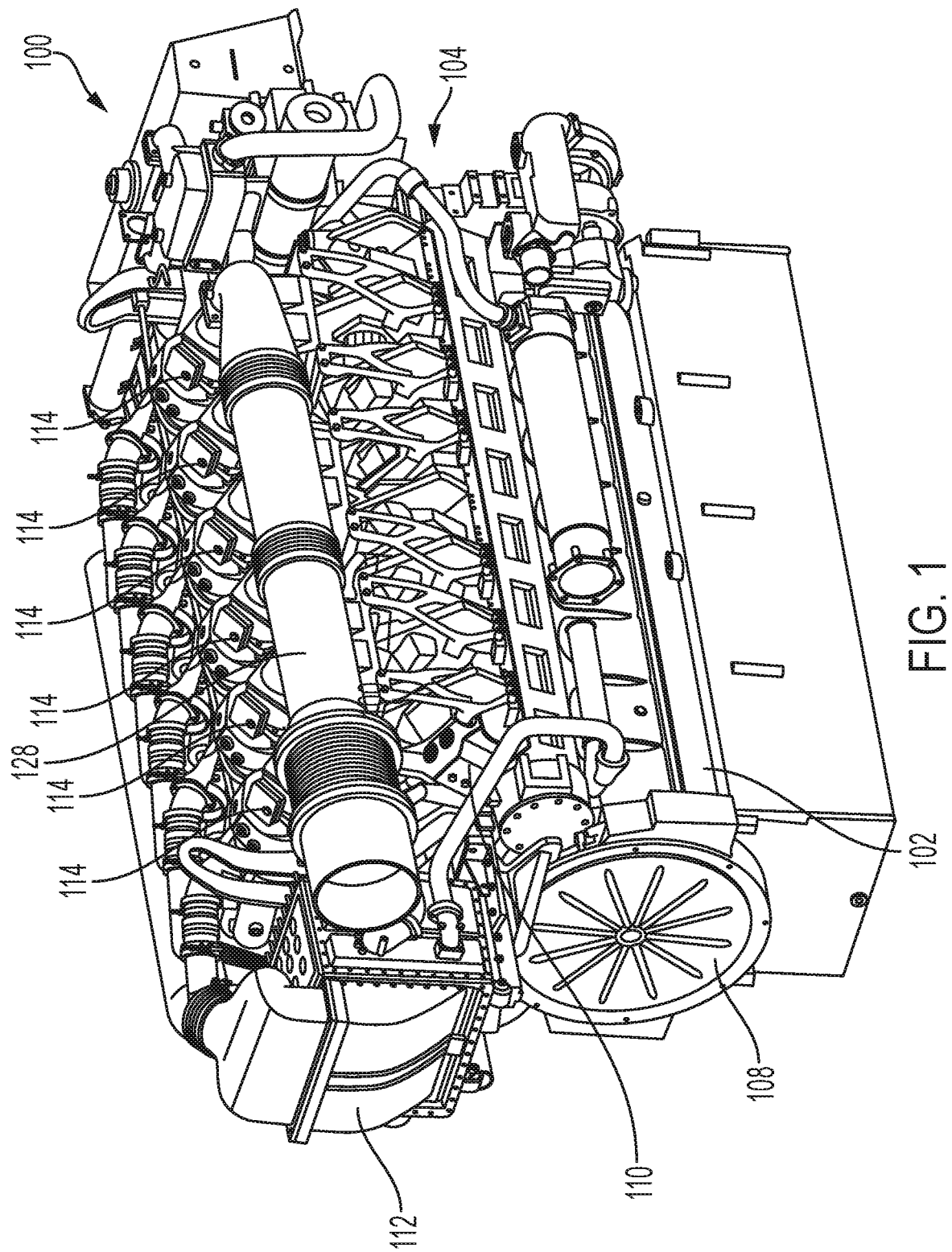
FIG. 1 is an outline view of an internal combustion engine in accordance with the disclosure.

An outline view of an engine 100 is shown from a side perspective in FIG. 1. Although the engine 100 as shown has a Vee configuration, the present disclosure is applicable to other engine types such as engines having an "I" or, stated differently, an inline configuration. Moreover, while the engine 100 is shown to have a total of sixteen cylinders (eight cylinders per bank), engines having fewer or more cylinders are also suitable for the benefits of the present disclosure. The engine 100 includes a cylinder case 102 that houses a crankshaft (not shown). The crankshaft is connected to a plurality of pistons (not shown) via connecting rods (not shown). The pistons are slidably and reciprocally disposed in bores (not shown) formed in a cylinder case 104, which may be integrated into a single structure with the cylinder case 102, and power the crankshaft to provide a useful mechanical working motion to a flywheel 108 of the engine 100 in the known fashion. A plurality of cylinder heads 110 covers the top, open ends of the bores housing the pistons.

The cylinder head 110 includes valves for providing fuel and air to the cylinders, and also for removing exhaust gases and other byproducts from the cylinders during operation, in the customary fashion. Air is provided to the cylinders via an intake manifold, which receives a charge through an intercooler 112. Exhaust gases are provided to six turbochargers 114 from the various engine cylinders through an exhaust log structure, as will be described hereinafter.

Figure 2:
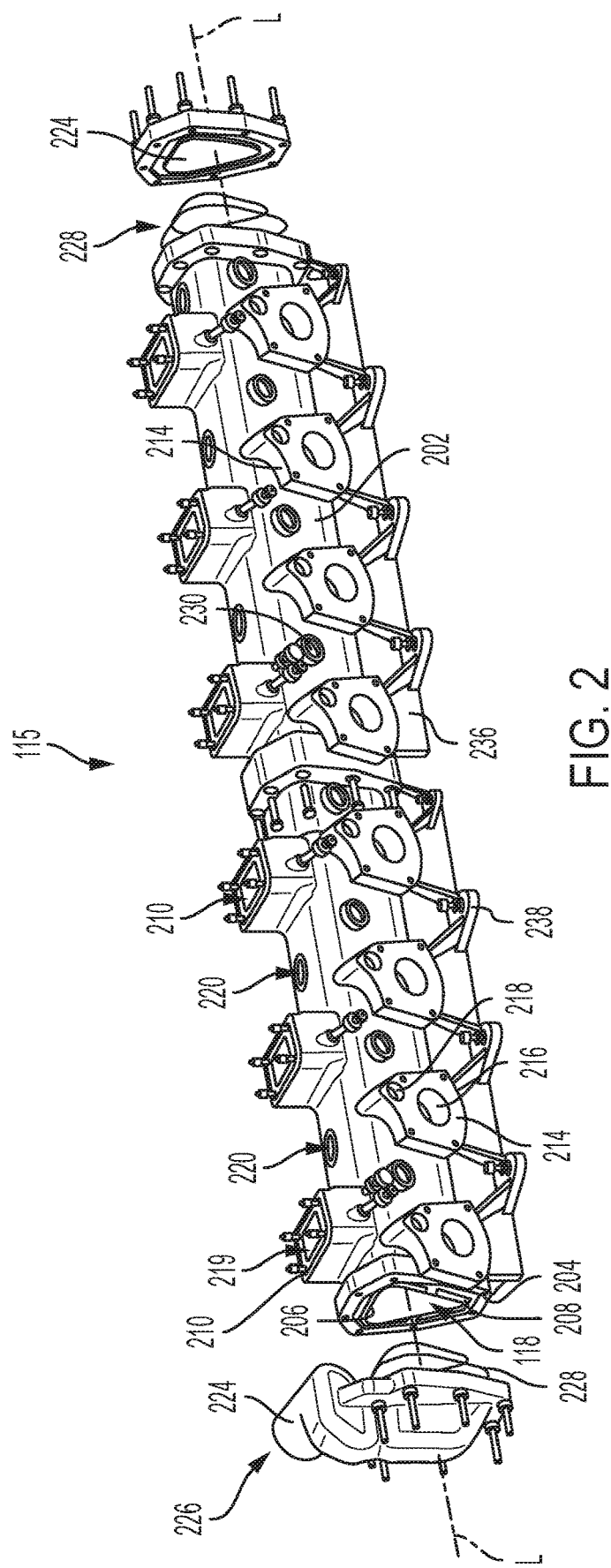
FIG. 2 is an outline view of an exhaust log structure, shown removed from the engine for illustration, in accordance with the disclosure.
Figure 3:
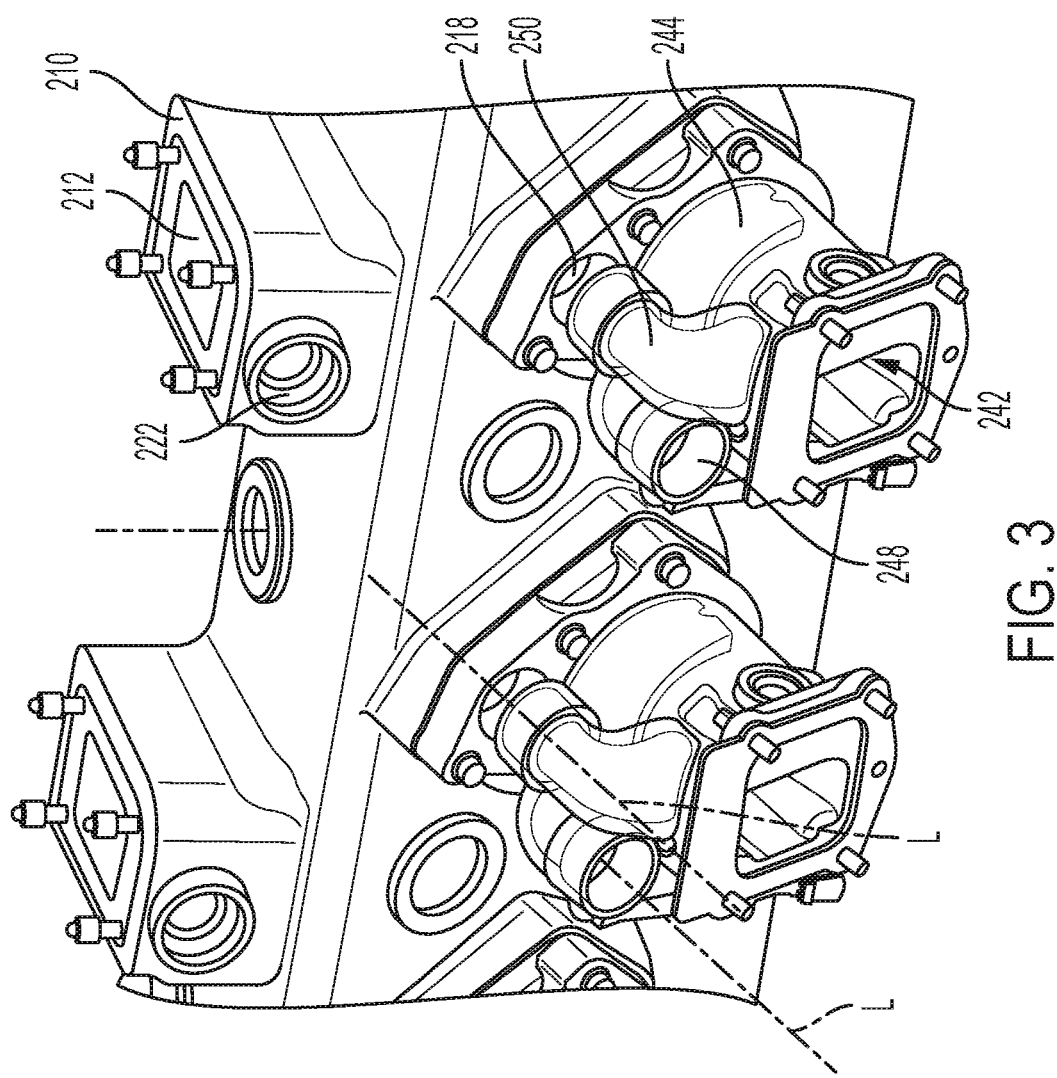
FIG. 3 is an enlarged, partial view of the exhaust log structure of FIG. 2.
Figure 5:
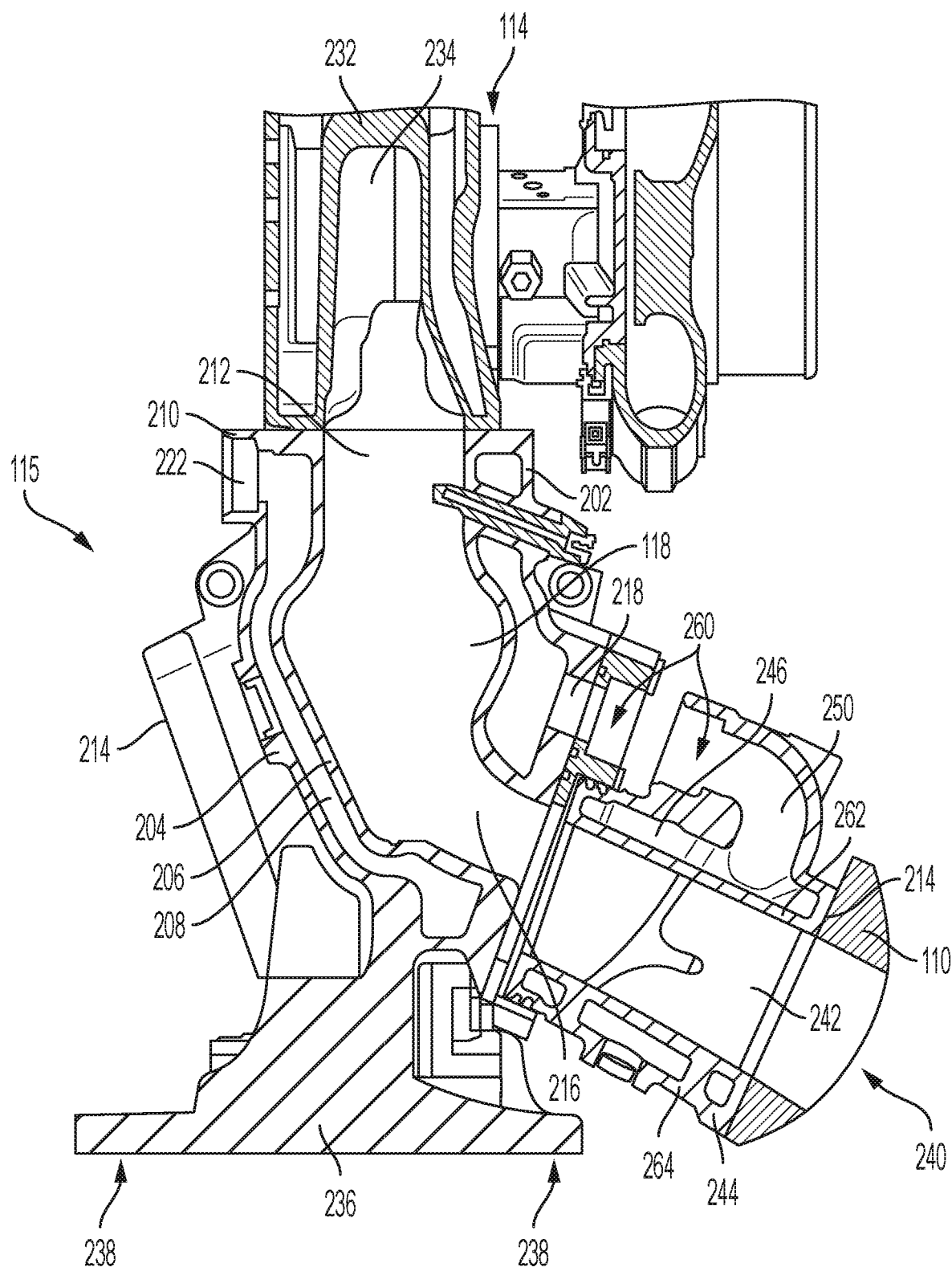
FIG. 5 is a partial cross section view through the exhaust log of FIG. 2 while connected to the engine of FIG. 1.

A view of the exhaust log structure 115, onto which the turbochargers 114 are connected and supported, is shown in FIG. 2, with an enlarged view shown in FIG. 3, and a partial cross section view shown in FIG. 5. In reference to these figures, the exhaust log structure 115 is disposed within the valley region of the engine 100 and connects directly onto the plurality of cylinder heads 110 mounted on either side of the engine's cylinder banks. Stated differently, the exhaust log structure is inboard relative to the cylinder case of the engine. The exhaust log structure 115 is an elongated structure that spans substantially the entire length of the cylinder case 102 along a rotational axis of the crankshaft (not shown) and forms a plenum or central exhaust collection cavity 118 (FIG. 5).

The exhaust log structure 115 includes a body 202 made up by an outer wall 204 and an inner wall 206. A coolant jacket 208 is defined between the outer and inner walls 204 and 206. The body 202 further includes various openings that communicate with the plenum 118, which is formed within the inner wall 206, or will the coolant jacket 208. More specifically, and as shown in FIG. 2, the outer wall 204 includes a plurality of turbine mounting flanges 210, each of which surrounds a gas outlet opening 212 that is fluidly open to the plenum 118. Additional openings such as plugged openings 230 may be formed to aid in manufacturing, for example, for removing sand from within the coolant jacket 208 following a casting operation.

The outer wall 204 further includes a plurality of inlet flanges 214, each of which surrounds a gas inlet opening 216, which is fluidly open to the plenum 118, and a head coolant inlet opening 218, which is fluidly connected to the coolant jacket 208. The outer wall 204 further includes a plurality of auxiliary coolant outlets 220, and a plurality of auxiliary coolant inlets 222 (shown in FIG. 5), both of which are fluidly connected to the coolant jacket 208. As can be seen in FIG. 2, both the plenum 118 and coolant jacket 208 extend in a longitudinal direction, L, through the body 202. Caps 224, one of which includes a coolant outlet 226, along with seals 228, are disposed to block the ends of the body 202 and maintain fluid separation between the plenum 118, the coolant jacket 208 and the environment.

The exhaust gas inlet openings 216 provide exhaust gas into the plenum 118, which provides exhaust gas to operate the six turbochargers 114 and, specifically, a turbine 232 of each turbocharger 114. During operation, exhaust gas exits the plenum 118 through the exhaust gas outlet openings 212, which are fluidly connected with an internal passage 234 of each turbine 232. In addition to effecting the gas connection to each turbocharger, the flanges 210 also support the turbochargers 114. Support of the exhaust log 112 onto the engine as describe above is accomplished by a support structure 236 that may lend is integral with the body 202 and may lend rigidity thereto. The support structure 236 is mounted onto the engine via a plurality of mounting bosses 238.

Figure 4:
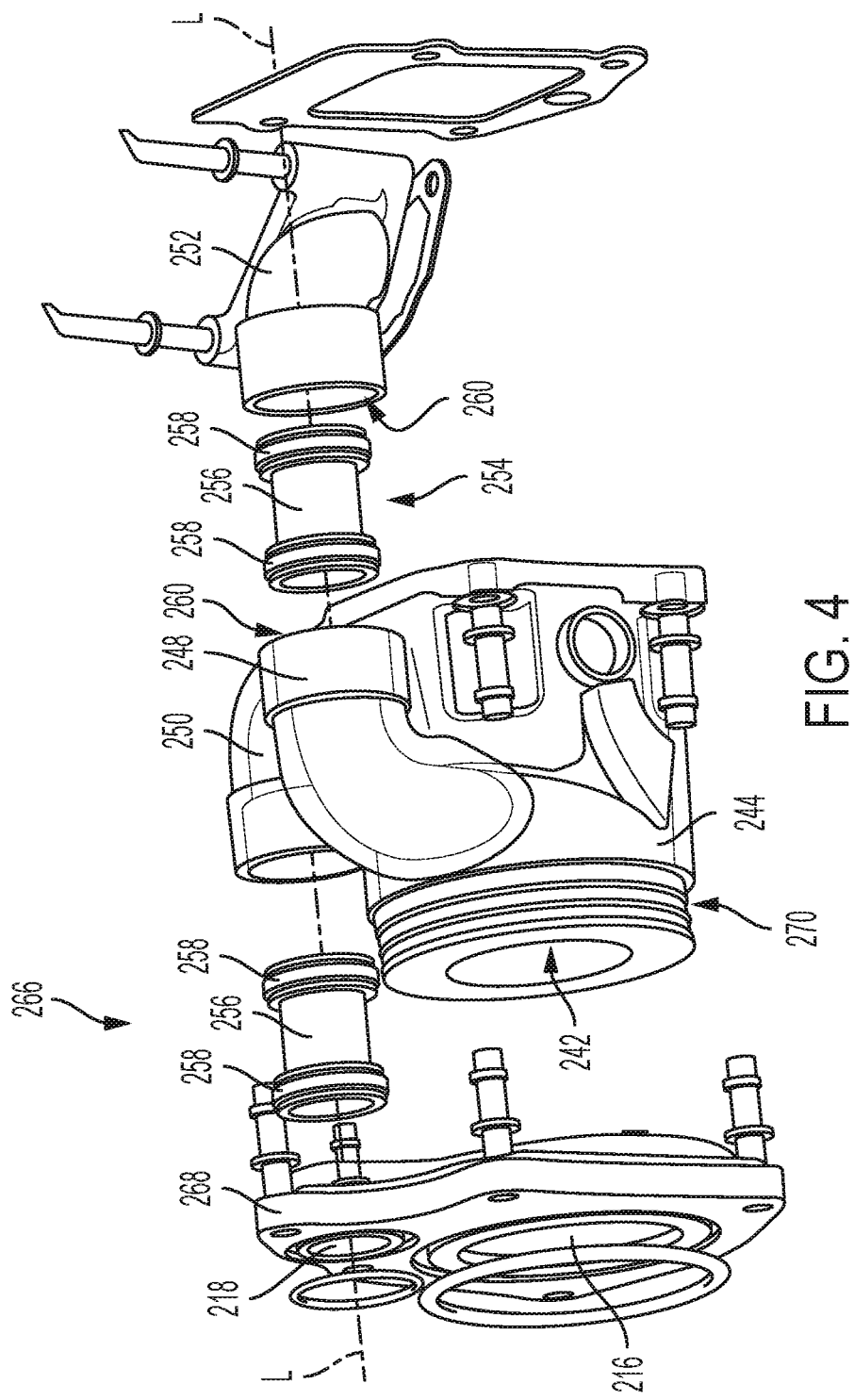
FIG. 4 is an exploded view of a transition component in accordance with the disclosure.

Each of the exhaust gas inlet openings 216 is fluidly connected to one or more exhaust ports 240 of the engine, which are fluidly connectable to at least one engine cylinder via exhaust valves (not shown), in the typical fashion. Exhaust gas from the exhaust ports 240 is conveyed to the exhaust gas inlet openings 216 via transfer conduits 242 what span a distance between the cylinder heads 110 and the exhaust log 112. More specifically, the transfer conduits 242 are formed and extend through a transfer housing 244, which is connected to and between the exhaust log 112 and the cylinder head 110 on either side of the engine. The transfer housing 244, therefore, carries exhaust gas to the exhaust log 112 from the engine cylinders. The transfer housing 244 also forms a cooling passage 246 therethrough, which includes an inlet passage 248 and an outlet passage 250. The inlet passage 248 (FIGS. 3 and 4) is fluidly connected to a coolant port 252 of the cylinder head 110 of the engine. Coolant circulating through the engine, for example, around cylinder liners and within the engine cylinder head is provided to the inlet passage 248 through the coolant port 252.

In the embodiment shown, an inlet jumper tube assembly 254 that includes a tube 256 and two radial seals 258 on its distal ends is inserted into corresponding sealing bores 260 formed in the coolant port 252 and the inlet passage 248 to slidably, and sealably, engage the two structures and permit the passage of coolant during engine operation from the cylinder head 110 to the inlet passage 248. The transfer housing 244 as shown includes a dual wall construction having an inner wall 262 and an outer wall 264. The inner wall 262 generally contains and internally defines the transfer conduit 242. The outer wall 264 surrounds the inner wall 262 leaving a gap therebetween that forms the cooling passage 246. Coolant from the cooling passage 246 is provided to the coolant jacket 208 through the coolant inlet openings 218 and from the coolant outlet passage 248. Similar to the inlet side, an outlet jumper tube assembly 266, which includes a tube 256 having two radial seals 258 that slidably and sealably engage corresponding bores 260. As can be seen, the inlet and outlet jumper tube assemblies 254 and 266 are aligned along parallel directions, L, such that axial tolerance stack-ups and thermal growth of components can be accommodated by the sliding ability of the jumper tubes relative to the exhaust log and the cylinder heads of the engine. In the illustrated embodiment, an adapter plate 268 forms the coolant inlet openings 218 and, specifically, the bores 260 and also the gas inlet openings 216. For sealing the exhaust gas connection provided through the transfer conduits 242, an end of the housing 244 includes two radial seals 270, which also slidably and sealably engage bores formed in the gas inlet openings 216 in a direction parallel to the direction L.

INDUSTRIAL APPLICABILITY

Figure 6:
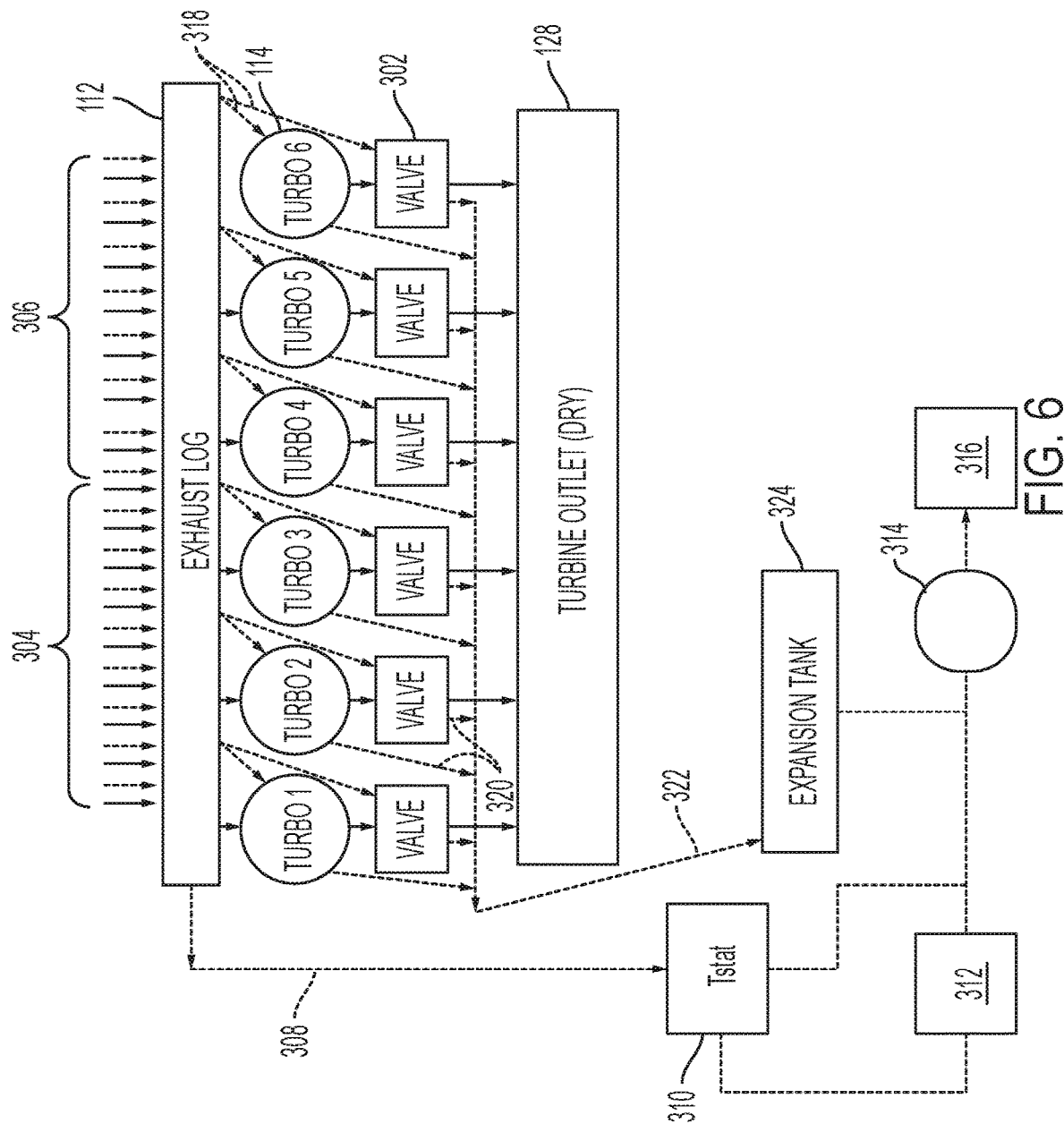
FIG. 6 is a schematic for an engine cooling system in accordance with the disclosure.
Figure 7:
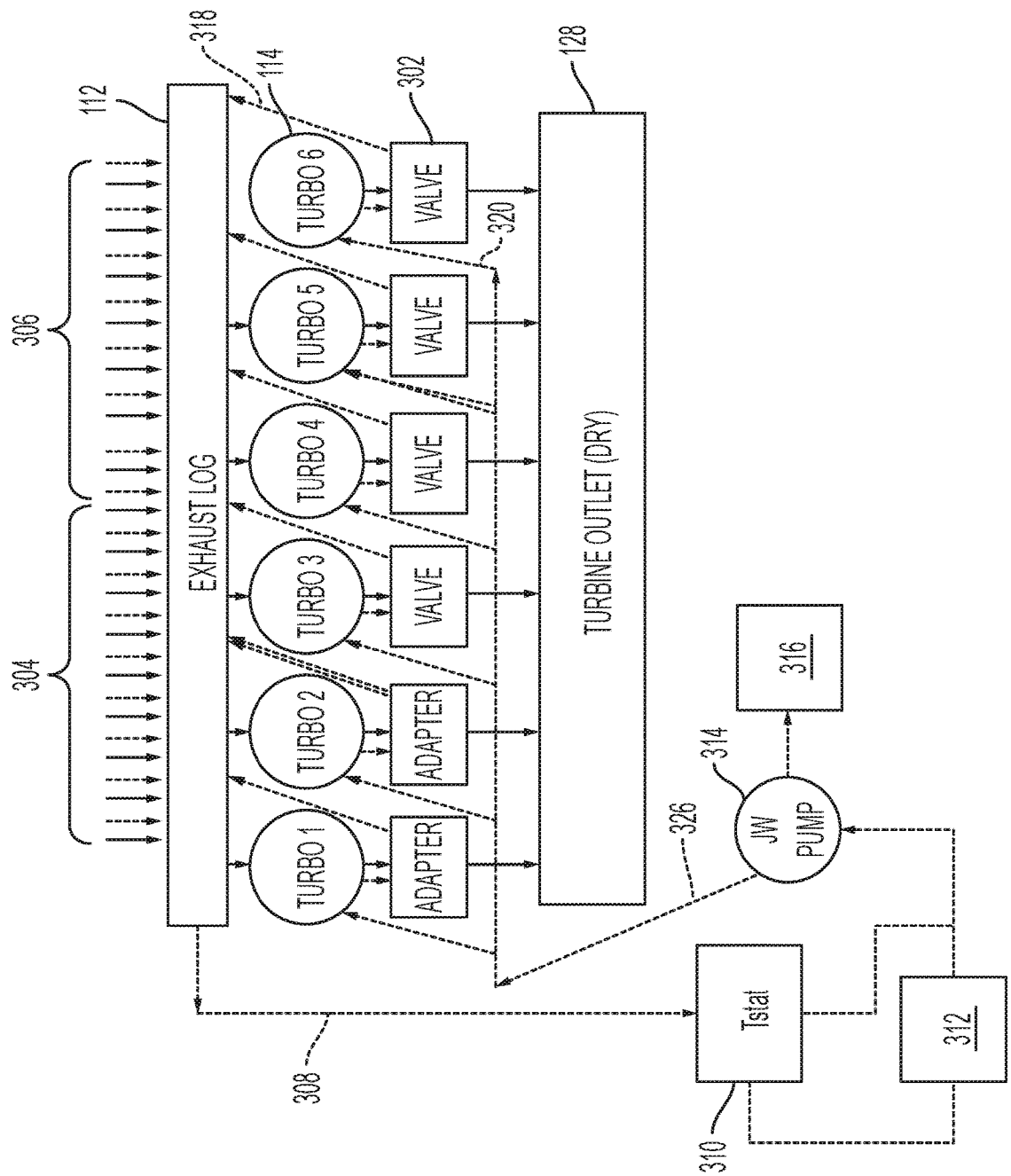
FIG. 7 is an alternative schematic for an engine cooling system in accordance with the disclosure.

The present disclosure is applicable to internal combustion engines and, more particularly, to reciprocating piston engines such as those used in marine applications. A schematic diagram of one embodiment of a coolant circuit 200 for an engine is shown in FIG. 6. An alternative embodiment for a coolant circuit 300 is shown in FIG. 7. In reference to these figures, the differences of which will be discussed below, the plurality of turbochargers, which in this embodiment includes the six turbochargers 114, further includes valves or adapters 302, one per turbine, which are configured to selectively activate or deactivate each turbine depending on engine operation. Relevant to the present disclosure, gas and coolant connections and flow paths are shown. Accordingly, sixteen (one from each cylinder) exhaust gas flows 304, and sixteen coolant flows 306 are provided to the exhaust log 112. The coolant passage portions of the exhaust log 112, for example, the coolant jacket 208, provide the coolant flows 306 to a coolant return passage 308. The coolant return passage 308 is connected to a thermostat 310, which can either directly or through a radiator 312 connects to an inlet of a pump 314. In the embodiment of FIG. 6, the pump 314 is connected to coolant circuits 316, which can extend through a cylinder case, cylinder head and/or other engine or vehicle components or systems, and which provide the coolant flows 306 to complete a coolant circuit.

In the embodiment shown in FIG. 6, coolant from the exhaust log is provided to cool the turbines and also the valves/adapters through passages 318. Coolant passing through and cooling the turbines of the turbochargers 114 and valves/adapters 302 is provided through passages 320 and collected in a purge line 322, which is connected to the expansion tank 324 and eventually to a pump inlet to complete a coolant circuit.

In contrast to the embodiment of FIG. 6, the embodiment of FIG. 7 uses a reverse flow direction in which an additional outlet 326 from the pump 314 is used to provide the turbines and valves/adapters with cool coolant through the passages 320. From there, coolant is returned to the exhaust log 112 through the passages 318. In other words, in the embodiment shown in FIG. 7, two parallel coolant circuits are created to provide coolant that is as cool as possible to the turbines and valves/adapters. The two parallel circuits meet in the exhaust log, which returns the entirety of the engine's coolant flow back to the thermostat. In this way, it has been found that the increased coolant flow rate through the exhaust log improves the operating temperature of the turbines and decreases the likelihood of coolant boiling through the exhaust log.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:
1. An internal combustion engine, comprising:
a cylinder case having a plurality of cylinder heads connected to the cylinder case and forming a plurality of coolant outlets;
an exhaust log structure disposed on the cylinder case and including:
an inner wall forming a gas plenum;
an outer wall disposed at an offset distance from the inner wall such that a coolant jacket is defined between the inner and outer walls;
a plurality of coolant inlets extending through the outer wall and being fluidly connected to the coolant jacket; and
a plurality of gas inlet ports that are fluidly open to the gas plenum, each having a bore:
a plurality of transfer housings, each transfer housing including:
an inner housing wall forming a gas passage, the inner housing wall forming an end that slidably and sealably engages a respective bore of one of the plurality of gas inlet ports in the exhaust log;
an outer housing wall disposed at an offset distance around the inner housing wall such that a cooling passage is defined in a space between the inner and outer housing walls;
a cooling passage inlet and a cooling passage outlet in fluid communication with the cooling passage;

wherein the plurality of coolant inlets is fluidly connected to the plurality of coolant outlets via the cooling passages in the plurality of transfer housings.

2. The internal combustion engine of claim 1, further comprising:
a plurality of auxiliary coolant outlets extending through the outer wall of the exhaust log structure and being fluidly connected to the coolant jacket,
a plurality of valves configured to selectively activate or deactivate a respective one of a plurality of turbines, each of the plurality of valves having a coolant passage extending therethrough,
wherein the plurality of auxiliary coolant outlets is fluidly in communication with the coolant passages extending through the plurality of valves.

3. The internal combustion engine of claim 2, further comprising a coolant pump associated with the cylinder case, the coolant pump having an inlet and an outlet, wherein the outlet of the coolant pump is arranged to supply a flow of coolant directly to the respective cooling passage of each of the plurality of transfer housings through a closed coolant circuit.

4. An internal combustion engine, comprising:
a cylinder case having a plurality of cylinders;
a plurality of cylinder heads connected to the cylinder case and forming a plurality of exhaust ports and a plurality of coolant outlets;
an exhaust log structure disposed on the cylinder case and including:
an inner wall forming a gas plenum;
an outer wall disposed at an offset distance from the inner wall such that a coolant jacket is defined between the inner and outer walls;
a plurality of gas inlet ports and a plurality of gas outlet ports extending through the inner and outer walls and being fluidly connected to the gas plenum;
a plurality of coolant inlets extending through the outer wall and being fluidly connected to the coolant jacket; and
a plurality of transfer housings, each transfer housing including:
an inner housing wall forming a gas passage, the gas passage fluidly connecting one of the plurality of exhaust ports with one of the plurality of gas inlet ports;
an outer housing wall disposed at an offset distance around the inner housing wall such that a cooling passage is defined in a space between the inner and outer housing walls;
a cooling passage inlet and a cooling passage outlet in fluid communication with the cooling passage;
a plurality of turbochargers, each including a turbine, wherein:
an inlet of the respective turbine is connected to receive exhaust gas from one of the plurality of gas outlet ports,
the plurality of gas inlet ports is connected to receive exhaust gas from the plurality of exhaust ports, and
the plurality of coolant inlets is fluidly connected to the plurality of coolant outlets via the cooling passages in the plurality of transfer housings;
a plurality of auxiliary coolant outlets extending through the outer wall of the exhaust log structure and being fluidly connected to the coolant jacket,
a valve connected on an outlet of a respective turbine of each of the plurality of turbochargers, each valve or adapter having a coolant passage extending therethrough and configured to selectively activate or deactivate the respective turbine;
wherein the plurality of auxiliary coolant outlets is fluidly in communication with the coolant passages extending through the valves of the plurality of turbochargers;
further comprising a coolant pump associated with the cylinder case, the coolant pump having an inlet and an outlet, wherein the inlet of the coolant pump is fluidly connected to the coolant jacket of the exhaust log structure;
wherein the outlet of the coolant pump is arranged to supply a flow of coolant to the plurality of coolant outlets of the plurality of cylinder heads;
wherein the outlet of the coolant pump is further arranged to supply an additional flow of coolant to the coolant passages extending through the valves of the plurality of turbochargers;
wherein, during operation, the flow of coolant, and the additional flow of coolant provided to the coolant passages, are returned to the inlet of the coolant pump through the coolant jacket of the exhaust log structure.

5. The internal combustion engine of claim 4, wherein the flow of coolant and the additional flow of coolant pass through parallel circuit paths between the outlet of the coolant pump and the exhaust log structure.

6. The internal combustion engine of claim 4, wherein each of the cooling passage inlet and outlet of each of the plurality of transfer housings forms a bore into which a jumper tube is slidably and sealably disposed, and wherein the bores of the cooling passage inlet and outlet extend along parallel axes.

7. The internal combustion engine of claim 6, wherein each of the plurality of gas inlet ports includes a bore into which at least a portion of a respective transfer housing is slidably and sealably disposed.

8. The internal combustion engine of claim 7, wherein the bore of a gas inlet port extends along a parallel axis with the axes of the coolant inlet and outlet of the respective transfer housing.

9. A method for operating an internal combustion engine, comprising:
providing a cylinder case having a plurality of cylinders;
providing a plurality of cylinder heads connected to the cylinder case and forming a plurality of exhaust ports and a plurality of coolant outlets;
providing an exhaust log structure disposed on the cylinder case and including:
an inner wall forming a gas plenum;
an outer wall disposed at an offset distance from the inner wall such that a coolant jacket is defined between the inner and outer walls;
a plurality of gas inlet ports and a plurality of gas outlet ports extending through the inner and outer walls and being fluidly connected to the gas plenum;
providing a plurality of coolant inlets extending through the outer wall and being fluidly connected to the coolant jacket; and
providing a plurality of transfer housings, each transfer housing including:
an inner housing wall forming a gas passage, the gas passage fluidly connecting one of the plurality of exhaust ports with one of the plurality of gas inlet ports;
an outer housing wall disposed at an offset distance around the inner housing wall such that a cooling passage is defined in a space between the inner and outer housing walls;
a cooling passage inlet and a cooling passage outlet in fluid communication with the cooling passage;

a plurality of turbochargers, each including a turbine;

connecting an inlet of the respective turbine to receive exhaust gas from one of the plurality of gas outlet ports, connecting the plurality of gas inlet ports to receive exhaust gas from the plurality of exhaust ports, and fluidly connecting the plurality of coolant outlets of the plurality of cylinder heads to the plurality of coolant inlets of the exhaust log structure via the cooling passages in the plurality of transfer housings, providing a plurality of auxiliary coolant ports extending through the outer wall of the exhaust log structure and being fluidly connected to the coolant jacket, providing a valve connected on an outlet of a respective turbine of each of the plurality of turbochargers, each valve or adapter having a coolant passage extending therethrough and configured to selectively activate or deactivate the respective turbine, and fluidly connecting the plurality of auxiliary coolant ports with the coolant passages extending through the valves of the plurality of turbochargers;

providing a coolant pump having an inlet and an outlet, and fluidly connecting the inlet of the coolant pump with the coolant jacket of the exhaust log structure;

supplying a flow of coolant from the outlet of the coolant pump to the plurality of coolant outlets of the plurality of cylinder heads;

supplying an additional flow of coolant from the outlet of the coolant pump to the coolant passages extending through the valves of the plurality of turbochargers; and returning the flow of coolant and the additional flow of coolant to the inlet of the coolant pump through the coolant jacket of the exhaust log structure.

10. The method of claim 9, further comprising providing the flow of coolant and the additional flow of coolant through parallel circuit paths between the outlet of the coolant pump and the exhaust log structure.

\* \* \* \* \*